United States Patent [19]

Dietrich, Jr. et al.

[11] Patent Number: 5,787,001

[45] Date of Patent: Jul. 28, 1998

[54] METHOD FOR USING SORTING TECHNIQUES IN A TYPE-SAFE WAY

[75] Inventors: Walter C. Dietrich, Jr., Yorktown Heights; Thomas Robert Ervolina, Hopewell Junction; John Peter Fasano, Briarcliff Manor; Jung-Mu Tang, South Salem, all of N.Y.

[73] Assignee: IBM Corporation, Armonk, N.Y.

[21] Appl. No.: 504,626

[22] Filed: Jul. 20, 1995

[51] Int. Cl.$^6$ .............................. G06F 11/00; G06F 9/00
[52] U.S. Cl. .............................. 364/468.03; 364/468.05; 364/468.09
[58] Field of Search .............................. 364/478.11, 478.12, 364/478.13, 468.03, 468.05, 468.06, 468.07, 468.08, 468.09; 395/600, 650, 500, 800, 700

[56] References Cited

U.S. PATENT DOCUMENTS

| | | | |
|---|---|---|---|
| 4,628,483 | 12/1986 | Nelson | 364/900 |
| 5,187,786 | 2/1993 | Densmore et al. | 395/600 |
| 5,396,622 | 3/1995 | Lee et al. | 395/600 |
| 5,487,164 | 1/1996 | Kirchhofer et al. | 395/600 |
| 5,493,680 | 2/1996 | Danforth | 395/700 |
| 5,551,018 | 8/1996 | Hansen | 395/600 |

*Primary Examiner*—Paul P. Gordon
*Attorney, Agent, or Firm*—Stephen C. Kaufman, Esq.; IBM Corporation

[57] ABSTRACT

A method for invoking an arbitrary sorting technique in a type-safe way. In one aspect, the method comprises the steps of providing a hierarchical schedule class comprising a schedule float subclass and a sorting schedule float subclass, subsumed by the schedule float subclass. The sorting schedule float subclass, in turn, comprises a schedule attribute class; a filter class; and a pair compare class. The method further includes using the hierarchical schedule class with each of an independent group consisting of a schedule attribute strategy, a filter strategy and a pair compare class strategy.

31 Claims, 16 Drawing Sheets

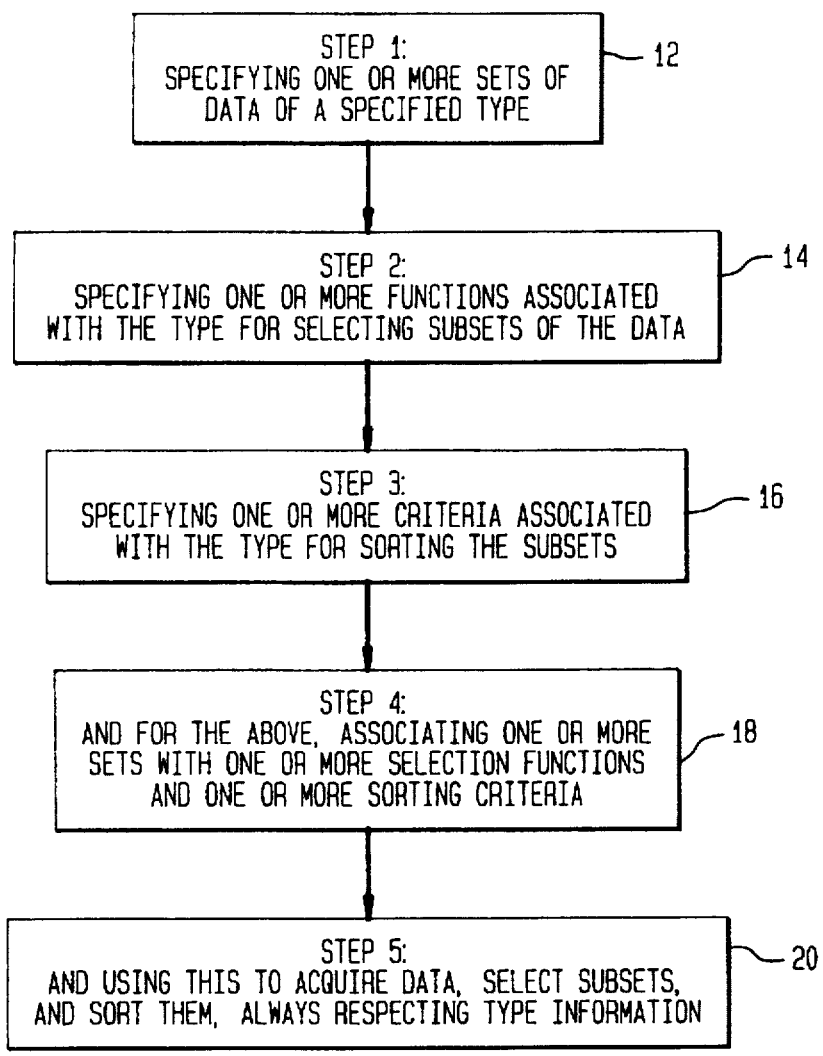

FIG. 2

ASSUME: ONE OR MORE GENERAL-PURPOSE SORT SUBROUTINES ARE AVAILABLE

| PRIOR ART | THIS INVENTION |
|---|---|
| 1. WRITE A DECLARATION OF ON ARRAY OR A CLASS THAT STORES THE ELEMENTS TO BE SORTED IN AN ARRAY | 1. DESIGN A PairCompare CLASS HIERARCHY. WRITE PAIR-COMPARISON ROUTINES THAT INHERIT FROM PairCompare CLASS AND TAKE TWO POINTERS TO THE "RIGHT" OBJECTS THAT SHOULD BE COMPARED |
| 2. WRITE A GOBAL PAIR-COMPARISON SUBROUTINE WHICH TAKES ARGUMENTS OF TWO POINTERS TO THE ELEMENTS THAT SHOULD BE COMPARED | 2. DESIGN A SCHEDULE CLASS AND DERIVE A SortingScheduleFloat CLASS TO HANDLE SCHEDULES WITH SORTING AND FILTERING CAPABILITIES |
| 3. WRITE A SORT SUBROUTINE CALL AND PASS THE ABOVE ARRAY, THE POINTER TO THE GLOBAL PAIR-COMPARISON SUBROUTINE, AND THE OTHER ARGUMENTS TO IT | 3. DERIVE A SortingScheduleFloat INSTANCE. <br><br> 4. DERIVE A PairCompare INSTANCE <br><br> 5. ASSOCIATE PairCompare INSTANCE WITH SortingScheduleFloat INSTANCE |
| DISADVANTAGE:<br>- NO TYPE CHECKING AT COMPILE TIME<br>- CAN BOMB OUT OR PRODUCE WRONG RESULT | ADVANTAGE:<br>SINCE "CORRECT" DATA TYPE IS ALWAYS ASSOCIATED WITH "CORRECT" PairCompare ROUTINE, AND "CORRECT" FILTER OBJECT, A TYPE-SAFE DATA SORTING AND SELECTING CAN BE ACHIEVED |

22

MULTIPLE INDEPENDENT CPUS

ARRAY PROCESSOR

METHOD FOR USING SORTING TECHNIQUES IN A TYPE-SAFE WAY

FIELD OF THE INVENTION

This invention relates to a method for using sorting techniques in a type-safe way.

BACKGROUND OF THE INVENTION

Classical sorting techniques are well known, and reference operations comprising arranging records in some logical order e.g., alphabetically according to some NAME key, or in numerical order according to some NUMBER key, such as a social security number or an account number. Known sorting techniques or algorithms suitable for these operations include bubble sort, heapsort, quicksort, radix sort or topological sort. Instruction on classical sorting techniques may be found in Sorting and Searching, Donald E. Knuth, The Art of Computer Programming, Vol. 3, Addison-Wesley Publishing Co. 1973.

SUMMARY OF THE INVENTION

In traditional non-object oriented languages, for example, Fortran or C, one preferably optimizes a selection of a particular sorting algorithm based on such desiderata as a size and initial ordering, of data to be sorted. For example, each of the above algorithms (quicksort, radix etc.) may be efficient for one application, but not for another, where efficiency may be defined as a composite of robustness, compatibility, correctness etc.

Our work relates to superimposing on the cited desiderata an additional disparate sorting metric, namely, whether or not a sorting technique is invoked in a type-safe way. We do this for the following reason.

A typical definition for "type-safe" is that there are no mismatched method arguments and assignment statements either in compile-time or in run time. In particular, the term "typing" references whether a variable or attribute is known to be an object (weak typing), or, may be declared more precisely as belonging to a particular class or one of its descendents (strong typing).

We note that the traditional non-object oriented languages do not have a capability for supporting a (preferred)strong type checking. This can lead to dangerous coding practices. The new object-oriented languages, on the other hand, have a capability for facilitating type checking, and therefore can realize a typesafe coding environment.

We further note that there are many different object-oriented languages: some support weak typing, such as Smailtalk, while others, such as Eiffel, Objective-c and C++, support strong typing. Now, even though typing is supported in most object-oriented languages, it is not usually enforced or required. Thus, implementing type-safe coding becomes a very important task in object-oriented software development.

As alluded to above, our work relates to superimposing or concatenating the disparate entities, namely sorting techniques and type-safe coding, in such a way that an arbitrary sorting technique, within a context of object-oriented programming, can be invoked in a type-safe way.

This concatenation action is significant. First of all, the prior art is silent on this notion. Second, it will be demonstrated below that invoking a sorting technique in a non type-safe way, can lead to program failures, or worse, produce incorrect results that sometimes cannot be easily detected.

We have now discovered a novel method for invoking an arbitrary sorting technique in a type-safe way. In a first aspect, the novel method comprises the steps of:
1) providing an hierarchical schedule class comprising:
  (i) a schedule float subclass; and
  (ii) a sorting schedule float subclass subsumed by the schedule float subclass and comprising:
   a) a schedule attribute class;
   b) a filter class; and
   c) a pair compare class; and
2) using the hierarchical schedule class with each of an independent group consisting of a schedule attribute strategy, a filter strategy and a pair compare class strategy.

In a second aspect, the novel method comprises a program storage device readable by a machine, tangibly embodying a program of instructions executable by the machine to perform method steps for invoking an arbitrary sorting technique in a type-safe way, said method steps comprising:
1) providing an hierarchical schedule class comprising:
  (i) a schedule float subclass; and
  (ii) a sorting schedule float subclass subsumed by the schedule float subclass and comprising:
   (a) a schedule attribute class;
   (b) a filter class; and
   (c) a pair compare class; and
2) using the hierarchical schedule class with each of an independent group consisting of a schedule attribute strategy, a filter strategy and a pair compare class strategy.

In a third aspect, the novel method comprises the steps of:
a. specifying one or more sets of data of a specified type;
b. specifying one or more functions associated with the type for selecting subsets of the data;
c. specifying one or more criteria associated with the type for sorting the subsets;
and for the above
d. associating one or more acts with one or more selection functions and one or more sorting criteria;
and using this for
e. acquiring data, selecting subsets, and sorting them, always respecting type information.

The novel method as defined can realize significant advantages. For example, its incorporation can be a centerpiece in a strategy to provide a programming approach that can make a development process faster and easier. In particular, the software developed can realize immanent qualities of correctness, reliability and ease of maintenance. These qualities flow from the inherent capabilities of the novel method, which comprises invoking an arbitrary sorting technique in a type-safe way. Moreover, the novel method has an advantage that it can be readily referenced to a model-view-controller.

BRIEF DESCRIPTION OF THE DRAWINGS

The invention is illustrated in the accompanying drawing, in which:

FIG. 1 itemizes type-safe data selecting and sorting steps;

FIG. 2 provides a comparison between prior art and this invention;

DETAILED DESCRIPTION OF THE INVENTION

Figure 3:
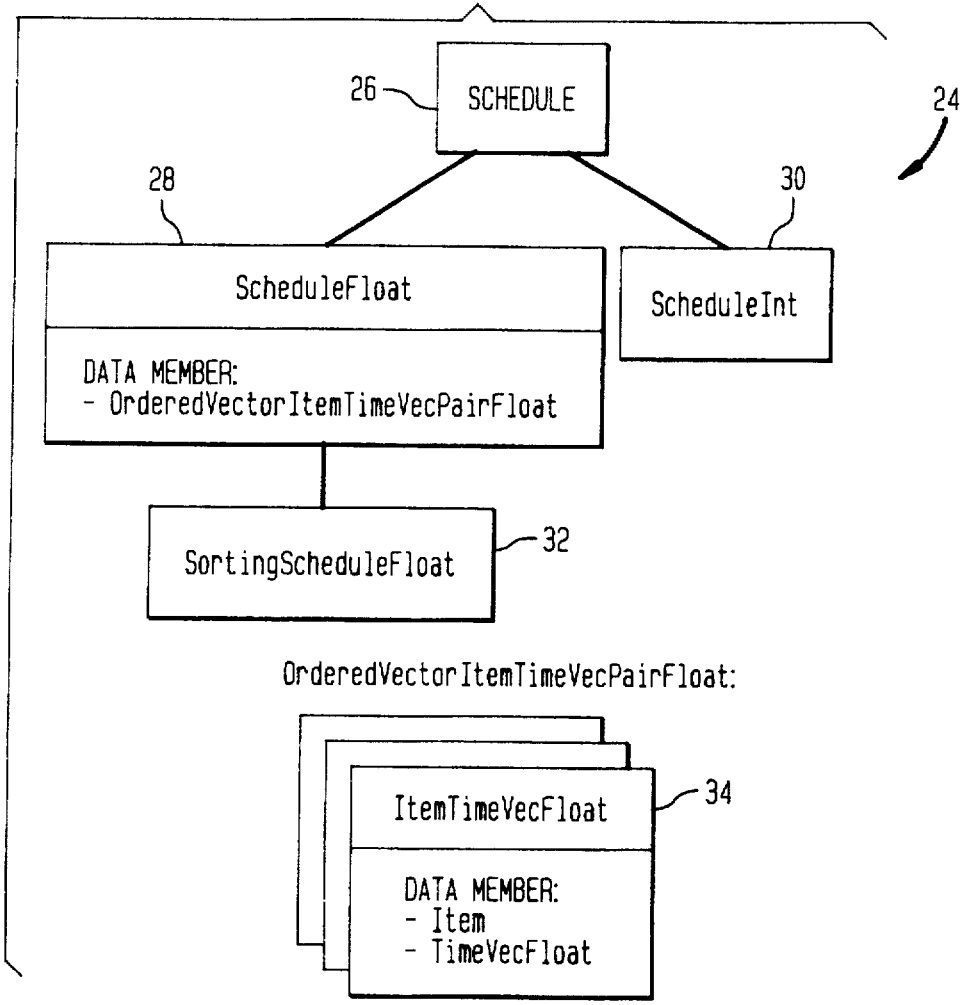
FIG. 3 shows a schedule class hierarchy.

This invention describes an object-oriented approach for developing a type-safe data selection and sorting system. It assumes one or more general-purpose sorting algorithms are available. For cases like this, one would like to know how to invoke the sorting algorithms in a type-safe way. The invention is also able to handle various data selection specifications.

We illustrate this invention with a real application in order to demonstrate a detailed approach. For example, when designing a manufacturing decision support tool to decide how to satisfy a set of demands with a set of part supplies and other available resources, one of the requirements is to let the user select the subset of part or demand schedule data in a tabular form and sort the subset in whatever order the user wants. There are many different types of part and demand schedules in this case. Thus, this user requirement involves following five steps when a schedule is requested (see FIG. 1, numerals 10–20):

(1) Specifying one or more sets of data of a specified type, (2) Specifying one or more functions associated with the type for selecting subsets of the data, (3) Specifying one or more criteria associated with the type for sorting the subsets, (4) And for the above associating one or more sets with one or more selection functions and one or more sorting criteria, (5) And using this to acquire data, select subsets, and sort them, always respecting type information.

A main design criteria is that when a schedule is requested, it should be able to initialize itself automatically and correctly. That is, the three steps above should be done automatically. Assuming a general-purpose sorting subroutine named Sort (many operating systems and languages provide such a routine. For example, Unix provides qsort) is available, we discuss the general sorting procedure used by most people in the past, and the new approach we propose in this invention.

Since exploring different types of data sorting algorithms is not the problem to be addressed here, the main concern, then, is how to invoke the Sort subroutine in a type-safe way, since Sort subroutine does not perform any data type checking. The Sort subroutine sorts an array of data in place. Here is the syntax of Sort.

```
void Sort (ArrayBase, NumberOfElements, Size, ComparisonPointer);
void *ArrayBase;
size_t NumberOfElements, Size;
int (*ComparisonPointer) (const void*, const void*);
where,
ArrayBase          Points to the element at the beginning of the array.
NumberOfElements   Specifies the number of elements in the array.
Size               Specifies the size of each element.
ComparisonPointer  Points to a global pair-comparison function, which
                   is passed two parameters that point to the elements
                   being compared.
```

In the past, the general steps of using Sort done by most people are:

(1) Write a declaration of an array or a class that stores the elements to be sorted in an array.

(2) Write a global pair-comparison subroutine which takes arguments of two pointers to the elements that should be compared.

(3) Write a Sort subroutine call and pass the above array, the pointer to the global pair-comparison subroutine, and other arguments to it.

There are many potential problems associated with the above approach.

First, since Sort subroutine takes a pointer to the first element of the array and another pointer to the global pair-comparison subroutine, there is no type checking at compile-time and there is no good way to associate these two together so that the "correct" data type can be passed to the "correct" pair-comparison subroutine which is designed to work with that particular data type.

Second, consider the global pair-comparison subroutine, it takes two arguments that point to the two elements being compared. The declaration for each of the pointers is "const void*", meaning any data type can be passed to this subroutine. Inside the subroutine, the developer has to "cast" (change) the pointers to the "correct" data types before doing any comparison. In order to make a "correct" Sort subroutine call, it is necessary to ensure that all element data types in the array are the same as those inside the global pair-comparison subroutine after "casting". If they are not the same, the program can fail with exceptions, or even worse, produce an incorrect result that sometimes can not be detected easily. As a result, this approach does not guarantee a type-safe way to invoke the general purpose Sort subroutine.

The present invention proposes a better approach to address the problems given above, and guarantees type-safe sorting and selecting, hence, producing high quality software. These are related to the quality factors mentioned above, namely, correctness and robustness (overall referred to as reliability). We now consider how this can be done.

The Sort subroutine sorts data based on the return value of the global pair-comparison subroutine supplied by the program that calls it. Thus, when developing the global pair-comparison subroutine, the data types of the two elements (declared as "const void*" in the argument list) have to be "casted" (changed) to the "correct" data type (same as the element data type in the array passed to Sort). When making the Sort subroutine call as in step 3 above, it is essential to make sure the "correct" array data type (for this case, schedule type) is always passed to Sort along with the "correct" (corresponding) pair-comparison subroutine which is designed to handle this particular data type. The problem addressed by this invention, then, is how to ensure the type-safe invoking of Sort. That is, how to ensure that a "correct" pair-comparison method along with "correct" data type is used in the data sorting process. Similar questions can be asked for data filtering process.

Since there are multiple schedule types, each of them may have many criteria for sorting (comparing) its content, many pair-comparison functions would be needed to serve different sorting specifications. Likewise, one needs many filtering (data selection) functions. The comparison between the prior art approach and the improved way proposed in this invention is shown in FIG. 2, numeral 22. We illustrate our approach in the following steps.

The basic steps for this invention, summarized above, are preferably realized in the following.

STEP 1: Design a Schedule class hierarchy, preferably as shown in FIG. 3, numerals 24–34.

FIG. 3 shows a generic Schedule class 26 on the top, which is a superclass for representing schedules of items. Items are parts or demands. The schedule is a vector for that item.

A subclass called ScheduleFloat 28 is "derived from" (i.e., inherits from) Schedule 26 to handle schedules with only floating data. The structure used for representing a floating-data schedule is an object 34 called OrderedVectorItemTimeVecPairFloat, which is an ordered vector of ItemTimeVecPairFloat objects. The ItemTimeVecPairFloat class contains a pair of data members, Item and TimeVecFloat. The TimeVecFloat class contains a vector of floating data.

Figure 4:
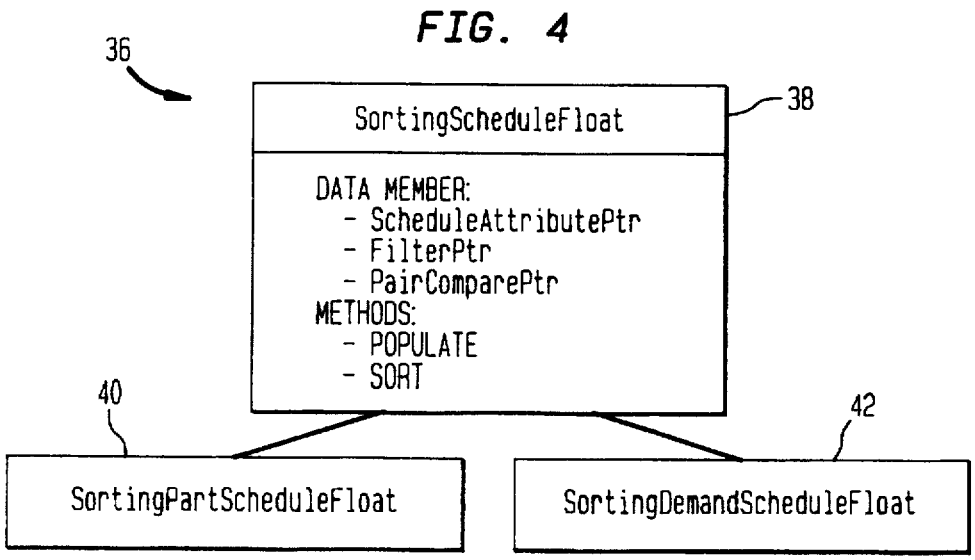
FIG. 4 shows a sorting schedule float class hierarchy.

STEP 2: Design a SortingSchedudeFloat class hierarchy, preferably as shown in FIG. 4, numerals 36–42.

A SortingScheduleFloat 38 is derived from ScheduleFloat class to handle schedules with data filtering, sorting capabilities. This is the class of interest and, from this class a SortingPartScheduleFloat class and a SortingDemandScheduleFloat class are derived to handle part and demand schedules respectively. The SortingScheduleFloat class 38 comprises three data members:

(1) ScheduleAttributePtr

This is a pointer to an object of class ScheduleAttribute. The ScheduleAttribute class has its own class hierarchy for different types of schedules as described in STEP 3. The schedule uses this data member to fetch the "correct" type of data from the database, such as part supply data.

(2) FilterPtr

This is a pointer pointing to an object of class Filter. The Filter class has its own class hierarchy for different types of filters as described in STEP 4. When fetching data, the schedule uses this data member to exclude certain data.

(3) PairComparePtr

This is a pointer pointing to an object of class PairCompare. The PairCompare class has its own class hierarchy for different types of pair-comparison functions as described in STEP 5. The sorting algorithm uses this function when sorting the schedule to do the comparison between two data elements, as mentioned earlier.

The SortingScheduleFloat class has many member functions to handle different messages. Here is the list of member functions of interest.

POPULATE METHOD

This method is used to populate the schedule with data. When invoked it: retrieves data to put in the schedule, excludes data based on the selection criteria, and sorts the data based on the comparison criteria. The "populate" method is implemented in the ScheduleAttribute class (ie, the base class). In the specific subclass of ScheduleAttribute a "kernalOfPopulate" method is defined and implemented. For example, class SupplyScheduleAttribute has a "kernalOfPopulate" method to retrieve "supply" data from the database. The ScheduleAttribute "populate" method invokes the "kernalOfPopulate" method in the subclass using polymorphism. As the data is being retrieved in the populate method, the selection criteria is applied to determine if the data should be excluded from the schedule. This is done by invoking the exclude method in the filter object. After the data has been retrieved and filtered, the sort algorithm is invoked by the populate method. The SortingScheduleFloat class stores the base class pointer of each data member. At run-time, the "correct" member function for the specific subclass of each data member is executed through the polymorphism feature of objectoriented programming. For example, the "kernalOfPopulate" method in SupplyScheduleAttribute class (derived from ScheduleAttribute class) and the "exclude" (to filter out) method in PartCategoryFilter class (derived from Filter class).

SORT METHOD

As part of the schedule populating process as described above in the "populate" method, after the data are populated to the schedule, the "sort" method is invoked by passing in a pointer to a PairCompare object. Inside the "sort" method, a Sort subroutine is invoked with one of the parameters being a global comparison function. Inside the global comparison function, a pair-comparison method, which is defined in the subclass of PairCompare class, is invoked via the polymorphism feature of object-oriented programming. Thus, with only one sort method defined in the SortingScheduleFloat class (base class), of which the Sort subroutine is invoked, different pair-comparison methods, which are designed to handle different data types, can be correctly invoked. This approach, hence, guarantees a type-safe invoking of Sort subroutine. A Detailed description of this method will be given later.

Figure 5:
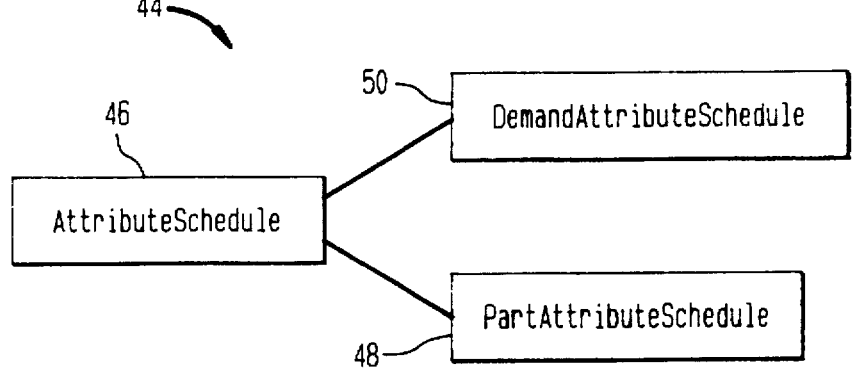
FIG. 5 shows an attribute schedule class hierarchy.

STEP 3: Design an ScheduleAttribute class hierarchy, preferably as shown in FIG. 5, numerals 44–50.

There is a generic ScheduleAttribute 46 class on the top. Two subclasses, PartScheduleAttribute 48 and DemandScheduleAttribute 50, are derived from this superclass to handle part and demand attributes respectively. Many specific part and demand attribute schedules are then derived from each of them to serve different purposes. Detail description of each of them will be given later. The main responsibility of this class hierarchy is to populate the schedule with the "correct" type of data. If filtering is required, only subsets of data are retrieved and these subsets are sorted based on the sorting criteria.

In the superclass, there is one important method called "populate", which is invoked by the SortingScheduleFloat class "populate" method to fill the schedule with "correct" data. For example, the pseudo code for the "populate" method in the class may look like these:

```
Open the database
Get the next data
If the data matches the 'attribute' pattern,
    then if it meets the selection criteria
        then get it.
        else do nothing.
    else do nothing.
```

-continued

```
Repeat the above process for next data until
   no more data can be retrieved
Close the database
Sort the final collection of data.
```

Figure 6:
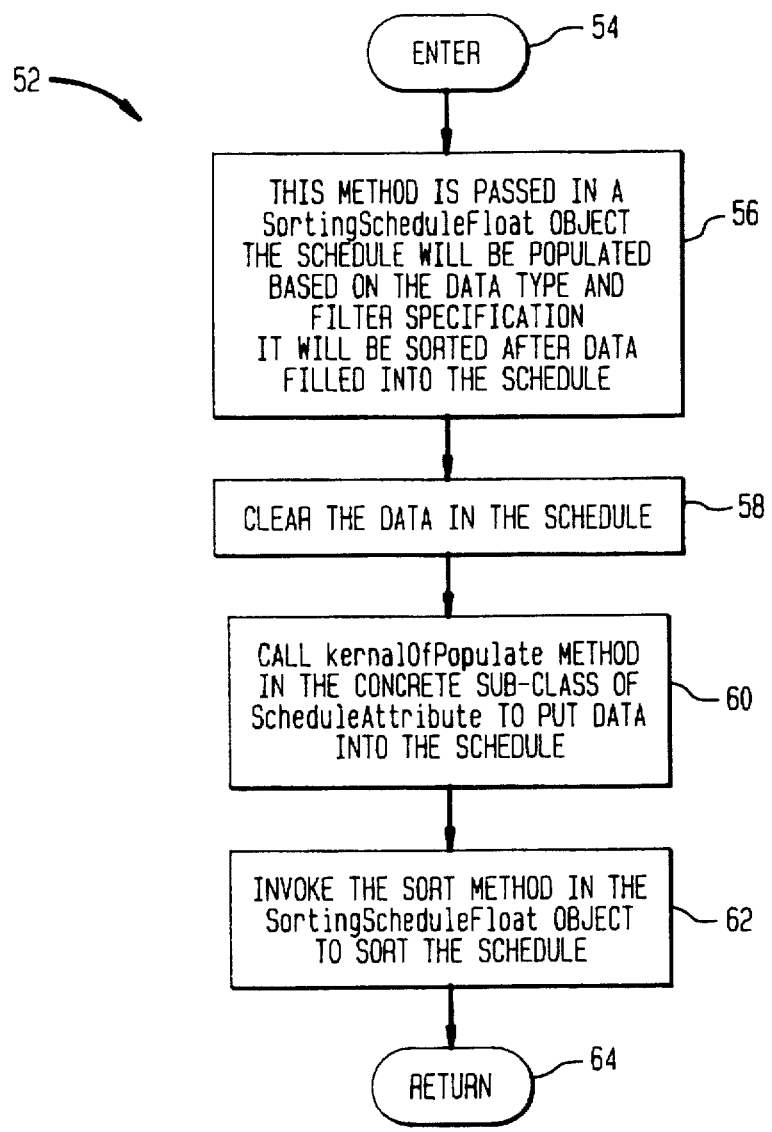
FIG. 6 provides a flowchart of populate method in schedule attribute class.
Figure 7:
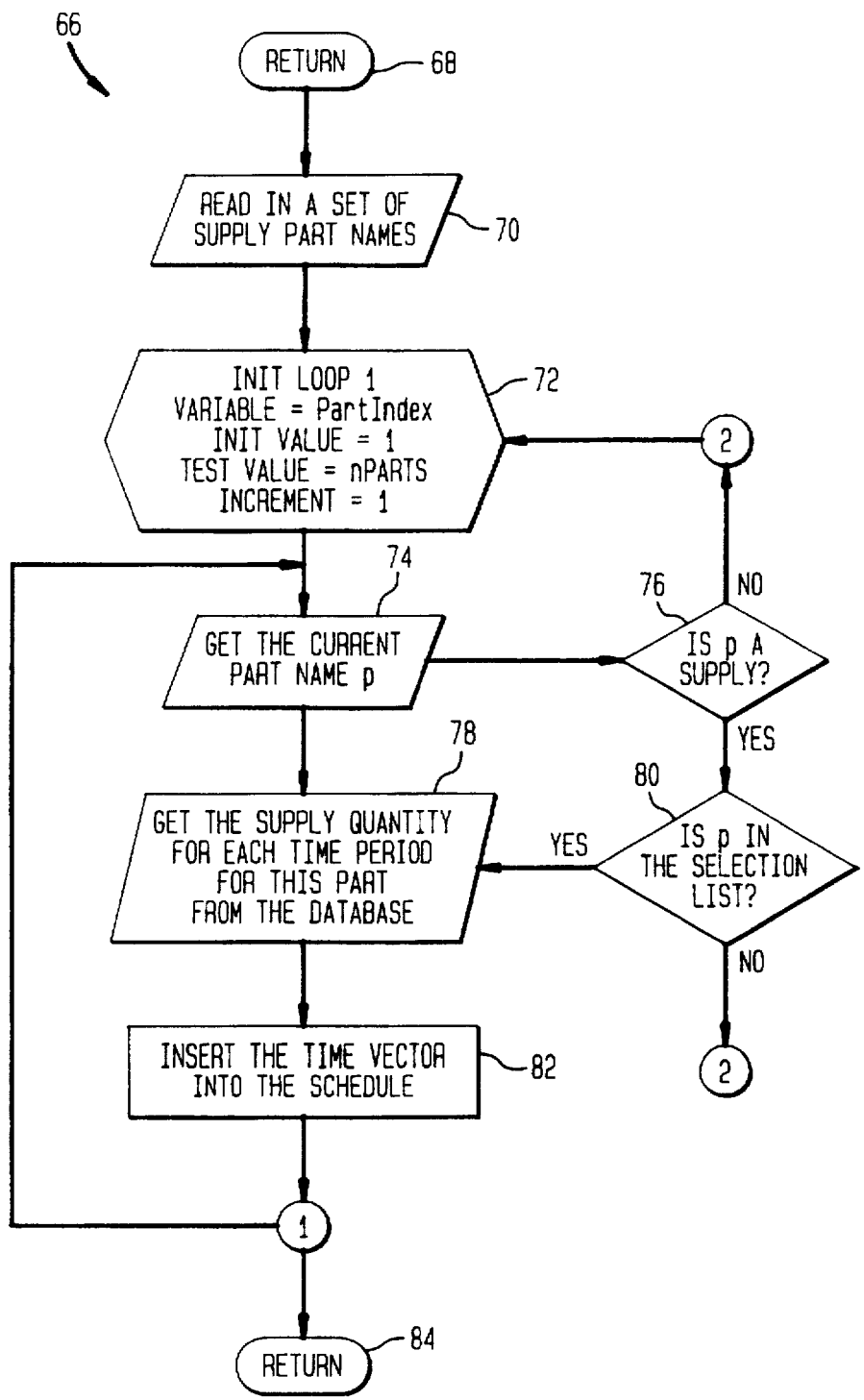
FIG. 7 provides a flowchart of kernal of populate method in the supply schedule attribute class.

In general there are three steps involved, as shown in FIG. 6, numerals 52–64:

(1) Clear the data in the schedule.
(2) Invoke a derived class method (called kernalOfPopulate) to do the class specific portions. During this process, in addition to getting the "correct" type of data, all unnecessary data are also filtered out based on the data selection (filtering) criteria. One example of "kernalOfPopulate" method as implemented in the SupplyScheduleAttribute class is shown in FIG. 7, numerals 66–84.
(3) Sort the final subset of data based on the sorting criteria.

Here is the detailed description of the two subclasses of ScheduleAttribute class.

PartScheduleAttribute class hierarchy

Figure 8:
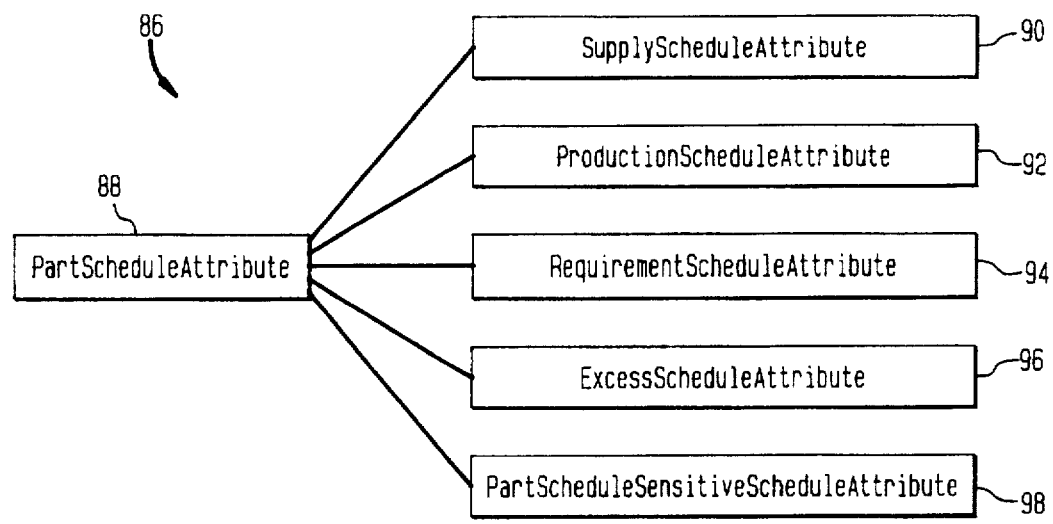
FIG. 8 shows a part schedule attribute class hierarchy.

There are many subclasses derived from this class to handle different tasks related to part objects. See FIG. 8, numerals 86–98.

SupplyScheduleAttribute
 This is used to get part supply data into the schedule.

ProductionScheduleAttribute
 This is used to get part production data into the schedule.

RequirementScheduleAttribute
 This is used to get part requirement data into the schedule.

ExcessScheduleAttribute
 This is used to get the number of excess parts in each time period into the schedule.

Figure 9:
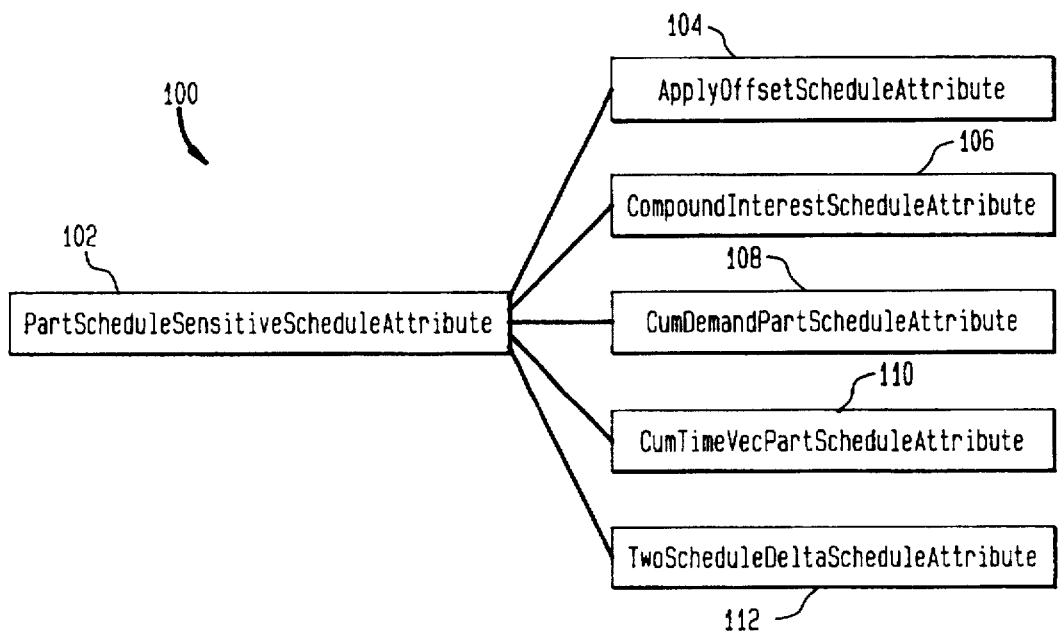
FIG. 9 shows a part schedule sensitive schedule attribute class hierarchy.

PartScheduleSensitiveScheduleAttribute
 This is used to get data for one schedule, the dependent schedule, based on the data contained in another schedule, the independent schedule. Many specific subclasses can be derived from this class as shown in FIG. 9, numerals 100–112. Each of these knows how to get the "correct" kind of data and how to perform the required computations.

ApplyOffsetScheduleAttribute
 This is used to shift the data in a part schedule (the dependent schedule) based on the offset data, $TV_{offset}(p,t)$ for part p in time period t, which is contained in another schedule (the independent schedule). If the old time vector for part p in the dependent schedule s is $TV_{old}(p,t)$ for time period t, then the new schedule will be, $TV_{new}(p,t)=TV_{old}(p,t)+TV_{offset}(p,t)$.

CompoundInterestScheduleAttribute
 The independent schedule is a part schedule s that represents some dollar amounts. A private data member holds the interest rate and the resulting dependent schedule c is a part schedule with the time vector $TV_c$ such that if part x is in the schedule then $TV_c(x,t)$=the compound interest of part x at time t by investing part x in $TV_s(x,i)$ in the time period i, for i=0, 1, . . . , t.

CumDemandsPartScheduleAttribute
 For this case, there are n, where n can be any finite positive number, independent demand schedules, d1, d2, . . . to dn, contained in this class. For each demand di, the demands for part p in each time period t is $TV_{di}(p,t)$ for i=1, 2, . . . , m. The resulting dependent schedule is a part schedule s, of which $TV(p,t)$ contains the total demands for part p over all demand schedules in time period t, such that if part p is in the schedule then $$TV(p,t) = \sum_{i=1}^{n} TV_{di}(p,t).$$

CumTimeVecPartScheduleAttribute
 The independent schedule s is a part schedule with a time vector $TV_s(p,t)$ for part p in time period t. The resulting dependent schedule c is a part schedule with the time vector $TV_c(p,i)$ for part p in time period i representing the cumulated part quantity from time period 0 to i, such that, $$TV_c(p,i) = \sum_{t=0}^{i} TV_s(p,t).$$

TwoScheduleDeltaScheduleAttribute
 The dependent schedule s is a schedule with time vectors such that $TV_s$ is the difference between two other independent schedules, a and b, which have time vectors $TV_a$ and $TV_b$, respectively, such that, $TV_s(p,t)=TV_a(p,t)-TV_b(p,t)$ for part p in the time period t.

Figure 10:
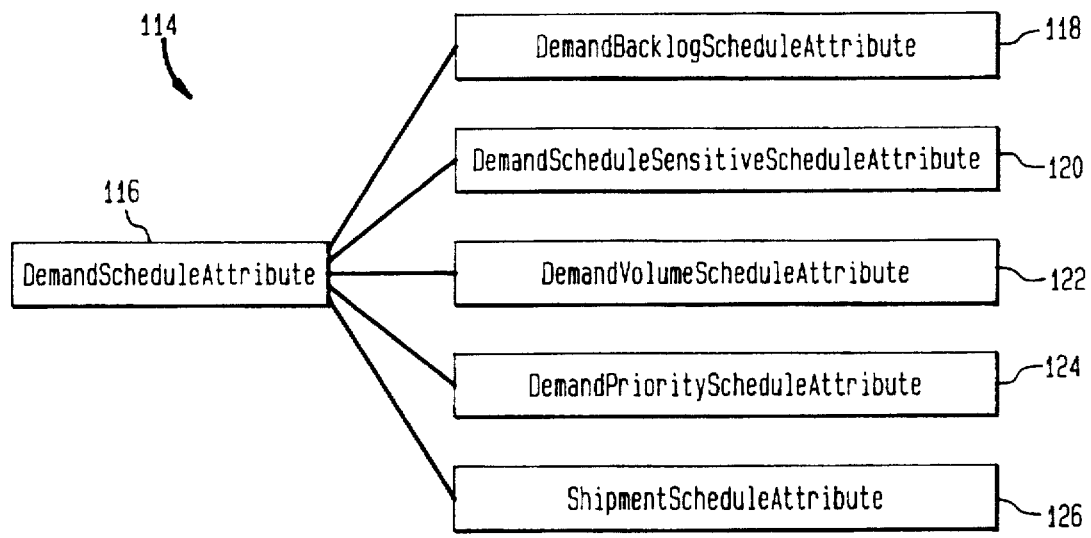
FIG. 10 shows a demand schedule attribute class hierarchy.
Figure 11:
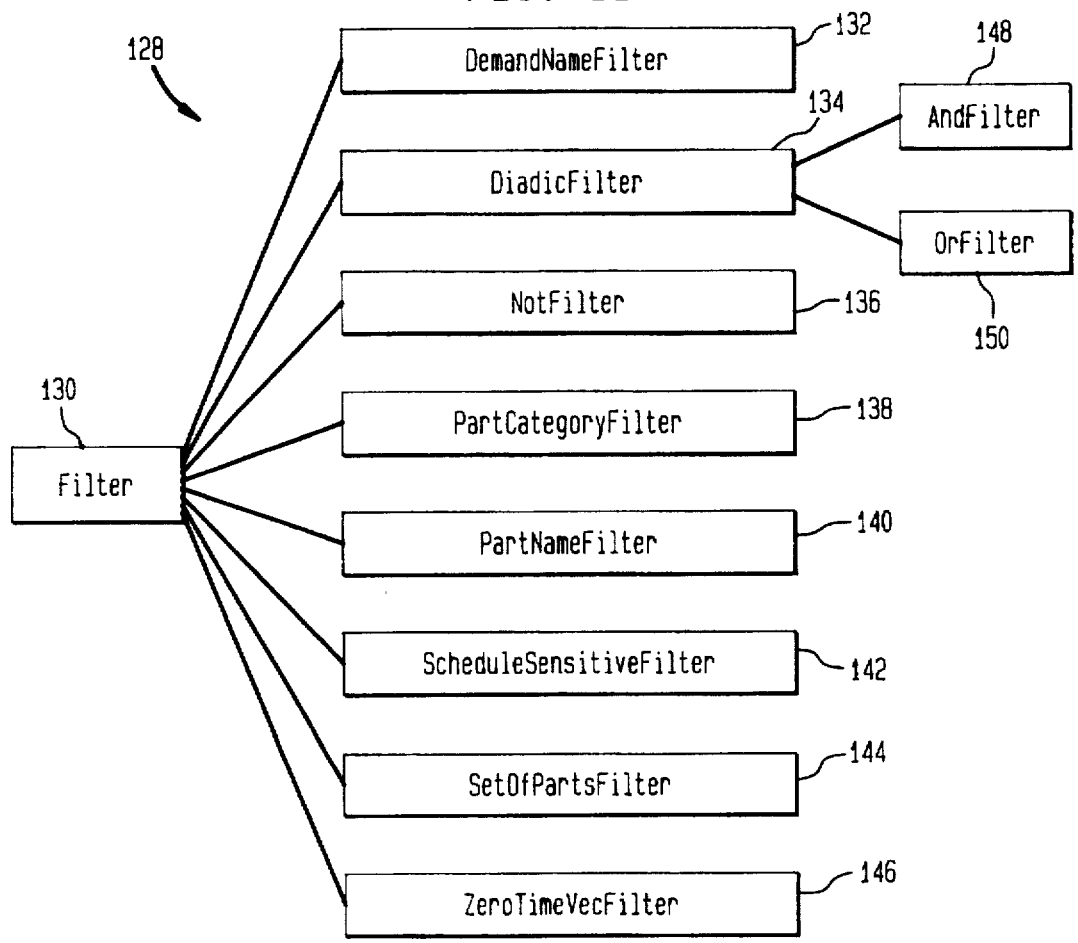
FIG. 11 shows a filter class hierarchy.

DemandScheduleAttribute class hierarchy.
 There are many subclasses derived from this class to handle different tasks related to demand (See FIG. 10, numerals 114–126). They are implemented in a fashion similar to the PartScheduleAttribute class hierarchy.

DemandBacklogScheduleAttribute
 This is used to get demand backlog quantities into the schedule.

DemandScheduleSensitiveScheduleAttribute
 This is used to get data into a schedule(dependent schedule) based on the data in another schedule (independent schedule).

DemandVolumeScheduleAttribute
 This is used to get demand volume into the schedule.

DemandPriorityScheduleAttribute
 This is used to get demand priority into the schedule.

ShipmentScheduleAttribute
 This is used to get demand shipment quantity into the schedule.

STEP 4: Design a Filter class hierarchy, preferably as shown in FIG. 1, numerals 128–150.

Figure 12:
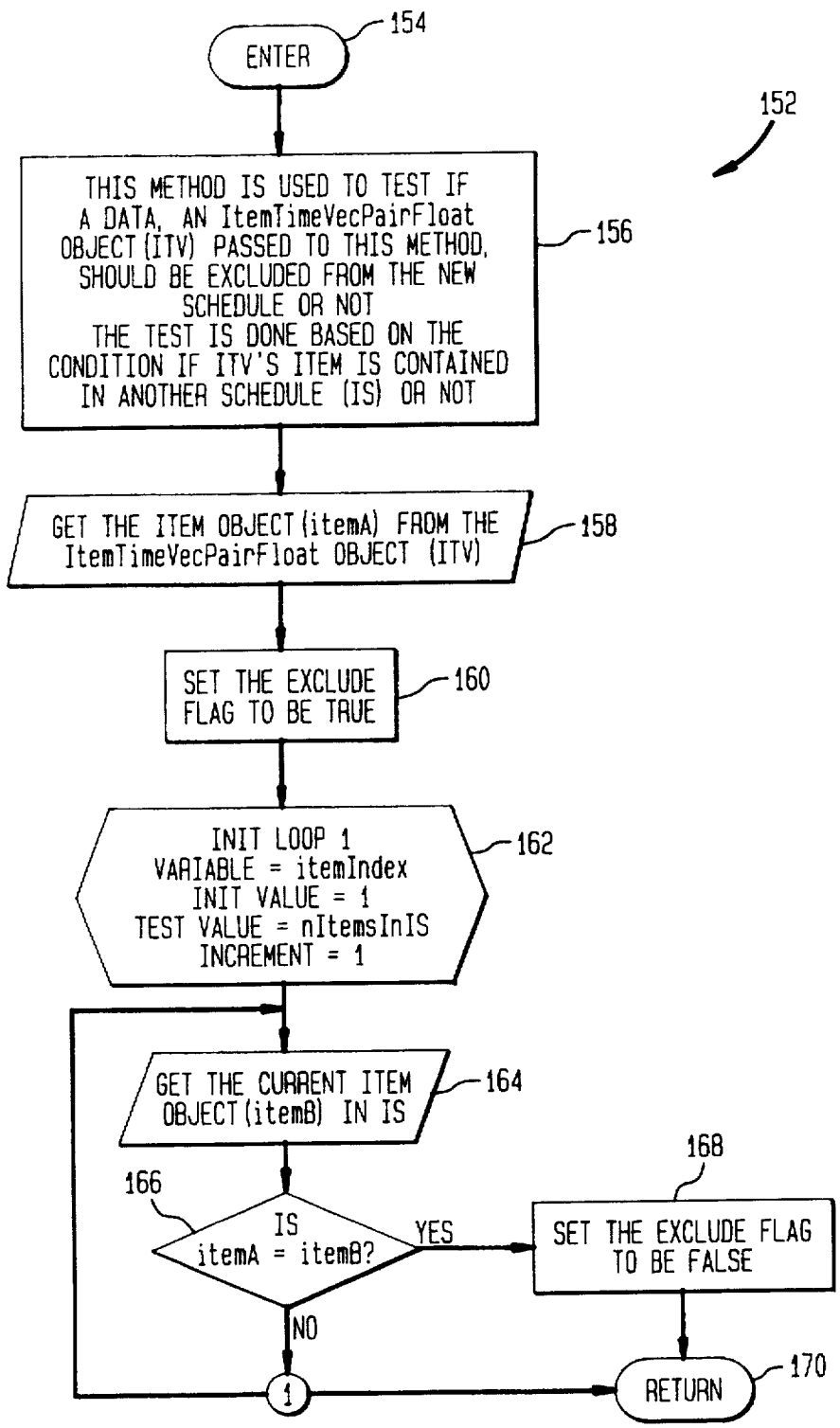
FIG. 12 shows a flowchart of exclude method in the schedule sensitive filter class.

There is a generic Filter class 130 on the top. Many subclasses are derived from the superclass to perform different kinds of data filtering. This is used by the SortingScheduleFloat class to select subsets of data from the database, as part of the data retrieval process. There are many ways to implement this data selecting function. One can implement a function called "exclude" to remove unnecessary data. Or, one can implement a function called "include" to include necessary data. For this example, a decision was made to implement an "exclude" method in this class. An "exclude" method, which performs the data selection task, is implemented in each of the specific subclasses of Filter class. The general algorithm of "exclude" method is to check each time vector in the schedule. If it matches the particular filtering criteria, it would then be "excluded" from the schedule. Each of the specific filter subclasses would handle its own filtering criteria. As an example, the implementation of "exclude" method in the ScheduleSensitiveFilter class is shown in FIG. 12, numerals 152–170. In this method, the time vector tv for item i will be "excluded" from the final schedule s (the dependent schedule) if the item i, associated with that time vector tv, is not contained in another schedule (the independent schedule). Here is a list of subclasses of Filter class we have developed.

DemandNameFilter

The data will be filtered out if the demand name does not match the pattern defined in the class.

DiadicFilter

This is a superclass for one type of filter, which filters data based on the results from two other filters. Examples of concrete subclasses derived from this class are AndFilter, and OrFilter. These can be used to filter out unnecessary data after a logical-And or logical-Not operation is done using the result of two different filters.

NotFilter

The data will be excluded if the filter it references says NOT to exclude the data.

PartCategoryFilter

The data will be filtered out if the part category does not match the pattern defined in the class.

PartNameFilter

The data will be filtered out if the part name does not match the pattern defined in the class.

ScheduleSensitiveFilter

The data in one schedule, schedule, is sensitive to data in another schedule, schedule$_b$. schedule, contains a pointer to a filter object f, for this case, a ScheduleSensitiveFilter object. This filter object f contains a pointer pointing to a different schedule,schedule$_b$. When schedule$_a$ is to be populated, the "exclude" method in the ScheduleSensitiveFilter object f, which is stored in schedule$_a$, will be used to get schedule$_b$. The data, which are not contained in schedule$_b$, will be filtered out as shown in FIG. 12.

SetOfPartsFilter

The data will be filtered out if the part name is not in the set of parts defined in the class.

ZeroTimeVecFilter

The data will be filtered out if the time vector contains all zeros.

Figure 13:
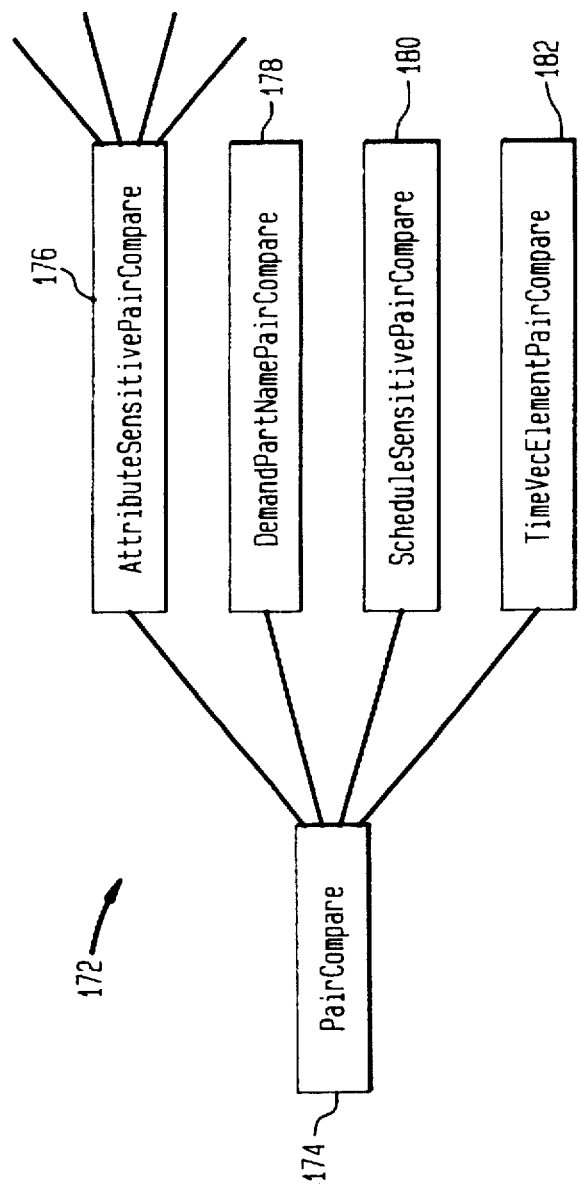
FIG. 13 shows a pair compare class hierarchy.
Figure 14:
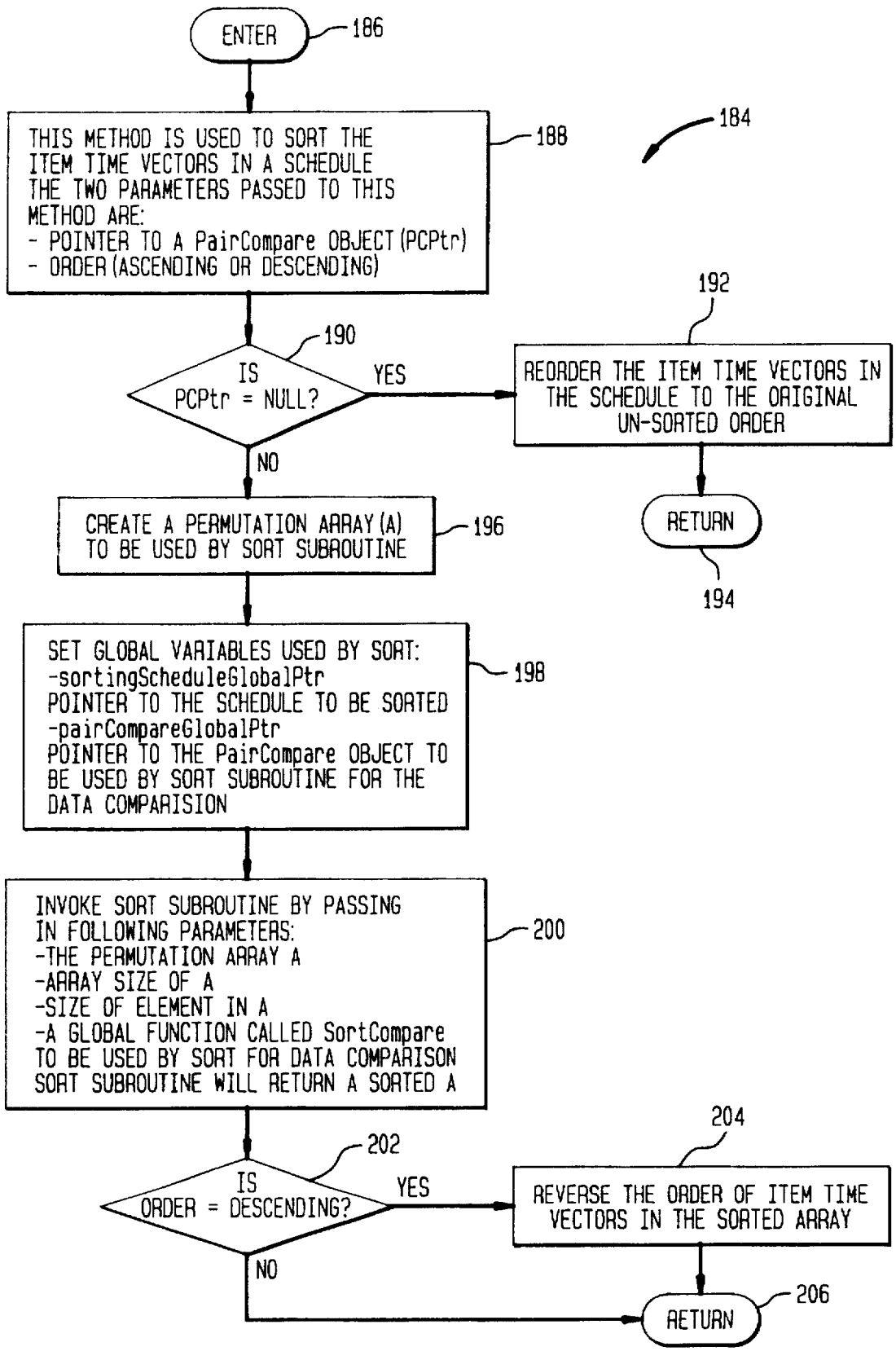
FIG. 14 shows an attribute sensitive pair compare class hierarchy.
Figure 15:
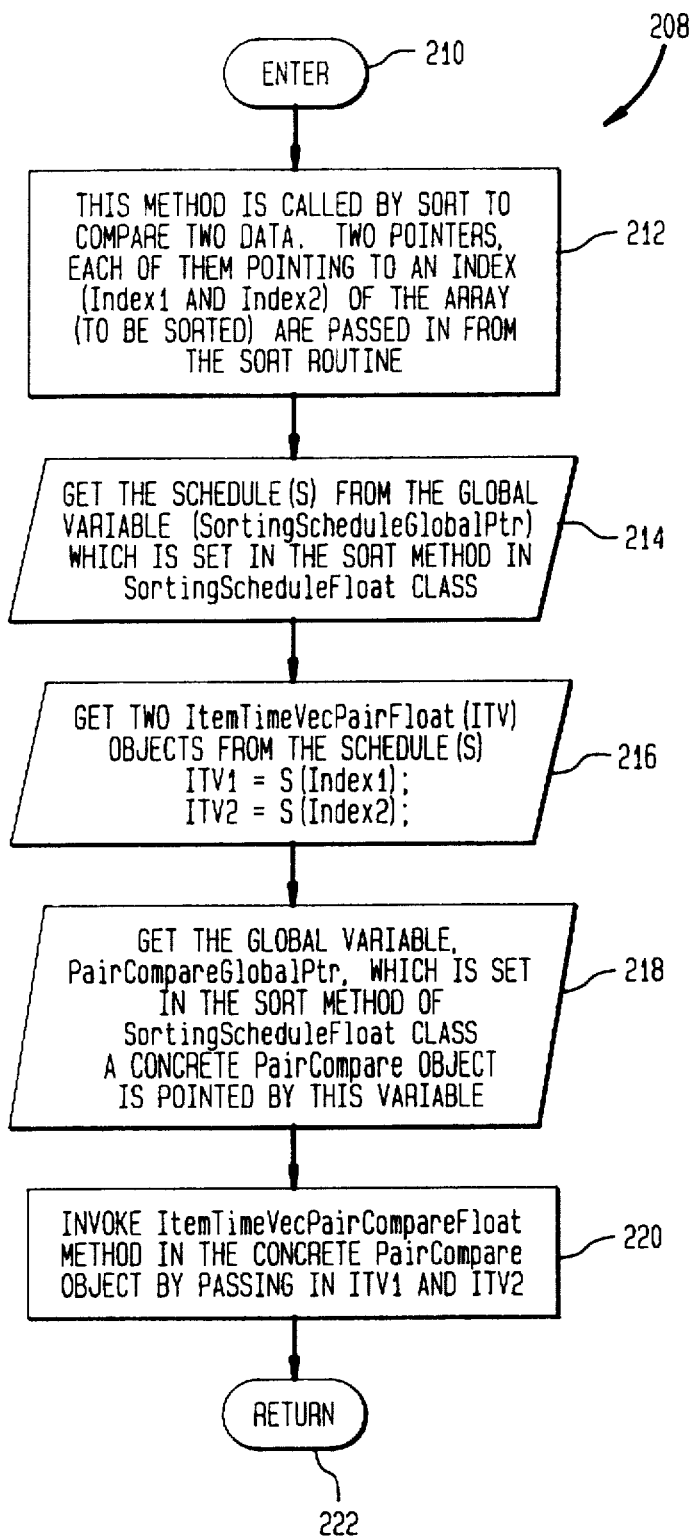
FIG. 15 provides a flowchart of sort method in the sorting schedule float class.
Figure 16:
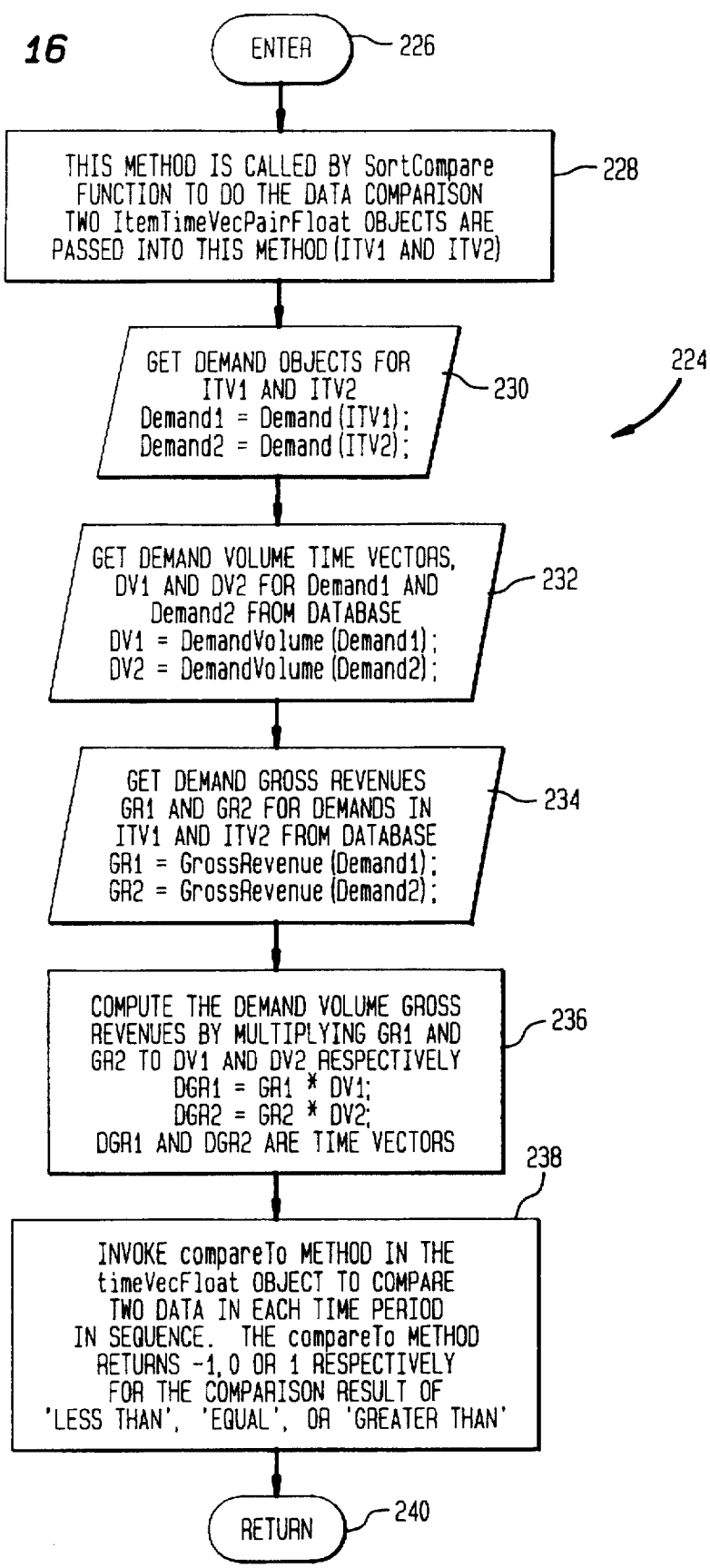
FIG. 16 provides a flowchart of sort compare function.
Figure 17:
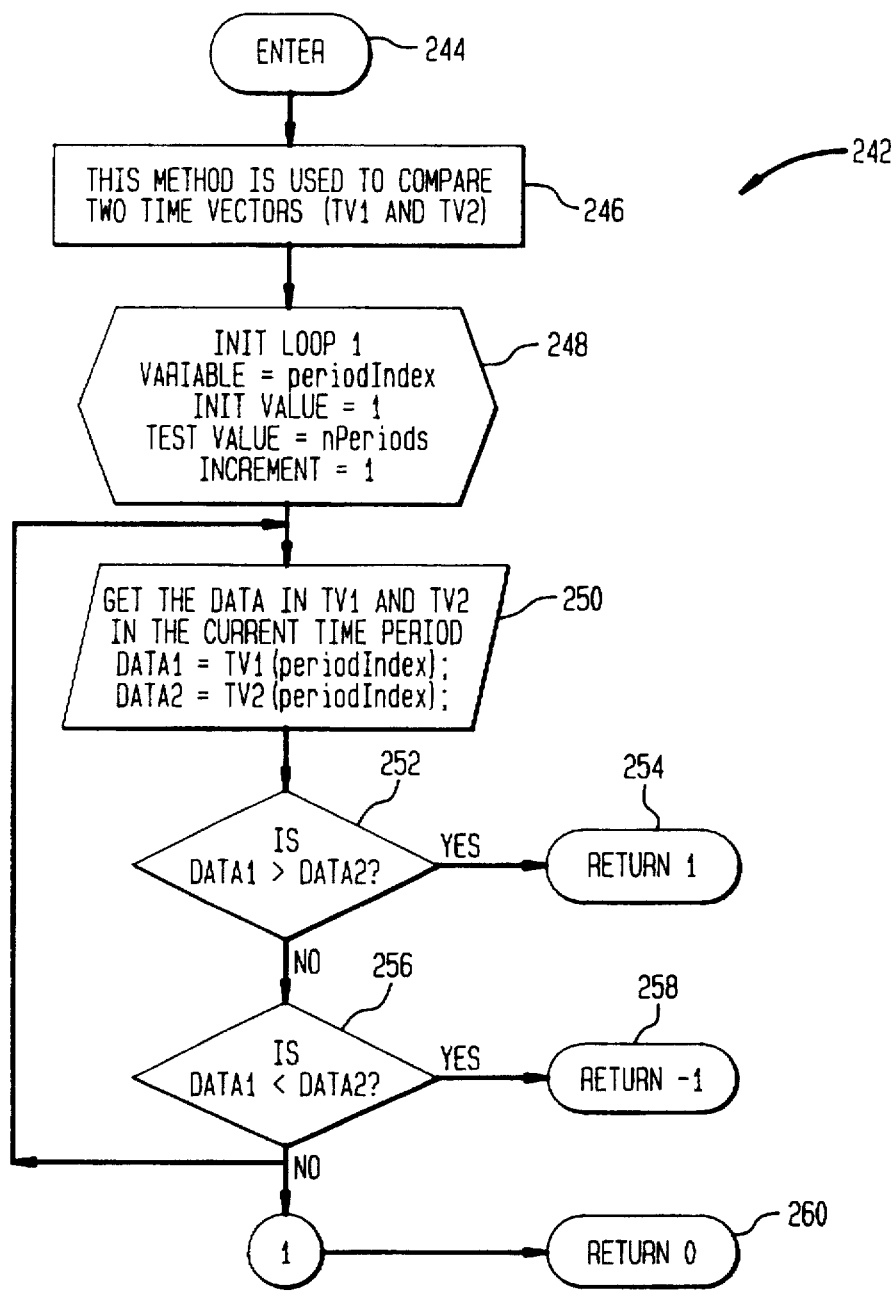
FIG. 17 provides a flowchart of item time vec pair compare float method in the demand gross revenue pair compare class.

STEP 5: Design a PairCompare class hierarchy, preferably as shown in FIG. 13, numerals 172–182.

There is a generic PairCompare 174 class on the top. Many subclasses are derived from this superclass to perform different data comparisons as part of sorting process.

As mentioned earlier, the heart of Sort subroutine, which is available as a general-purpose sort program, is a global data pair comparison function, called "SortCompare". Thus, this is a very important class for this invention. In this class hierarchy, one important method is called "itemTimeVecPairCompare". It is used by the Sort subroutine to compare two elements(itemTimeVecPairFloat objects) in an array. Each of the subclasses has its own version of implementation. When a schedule is to be sorted, the "sort" method in the schedule is invoked and a general Sort subroutine is invoked in the "sort" method. A global function called "SortCompare" is then invoked by the Sort subroutine. In this "SortCompare" function, a specific "itemTimeVecPairCompare" method is invoked to do the actual data pair comparison. The pointer pointing to the PairCompare class, which is stored in the SortingScheduleFloat class, would fetch the "correct" implementation via the polymorphism feature of object-oriented programming. As described earlier, "correct" data type will always be associated with "correct" data pair comparison method (implemented in the specific PairCompare object) for the general Sort subroutine, based on the complex SortingScheduleFloat, Filter, and PairCompare class structures we proposed here. This leads to a type-safe sorting and produces a much higher quality software. The flowchart of this "sort" method and other related methods are illustrated in FIGS. 14, 15, 16, and 17, (numerals 184–260).

Many subclasses can be derived from this superclass to perform different kinds of data comparisons. Some of them are listed here as examples. Note that some of them have major sorting criteria, meaning sorting on this criteria first, and minor sorting criteria, meaning sorting on this criteria if the major one does not change the order.

AttributeSensitivePairCompare

Figure 18:
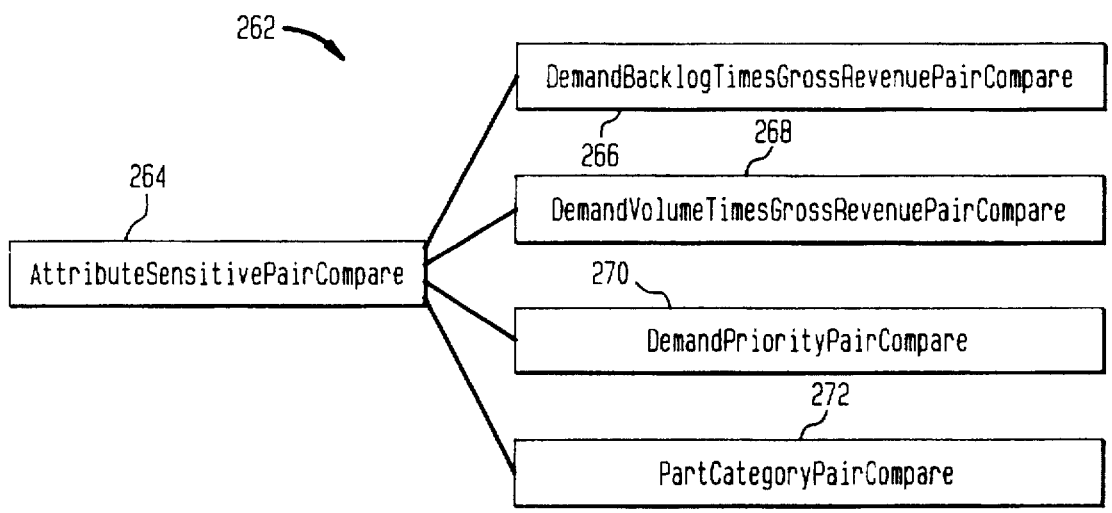
FIG. 18 provides a flowchart of compare to method in the time vec float class.

This is an abstract base class for implementing pair-compare strategies used for sorting on attributes (such as demand name, part category, total demand gross revenue, etc.) of an ItemTimeVecPair object (a class containing an item and an associated time vector) rather than just the data stored in it. Following is a list of some subclasses derived from this class. This class hierarchy is shown in FIG. 18, numerals 262–272.

Demand BacklogTimes Gross RevenuePairCompare

This is used to sort time vectors in a schedule using the demand's backlog volume time vector multiplied by the demand's gross revenue as the major sorting criteria. The data in each time period of one time vector is compared to the corresponding data in another time vector in sequence. If the major sorting criteria does not change the order, then use demand's backlog time vector as the minor sorting criteria.

DemandPriorityPairCompare

This is used to sort time vectors in a demand schedule using the demand's priority time vector as the major sorting criteria. If demand priorities are equal, the time vector in the demand schedule is used as the minor sorting criteria.

Demand VolumeTimesGross RevenuePairCompare

This is used to sort time vectors in a schedule using the demand's volume time vector multiplied by the demand's gross revenue as the major sorting criteria. If the major sorting criteria does not change the order, then the demand's volume time vector is used as the minor sorting criteria.

PartCategoryPairCompare

This is used to sort time vectors in a part schedule using the part category as the major sorting criteria. If part categories are equal, then the part schedule's time vector is used as the minor sorting criteria.

DemandPartNamePairCompare

This is used to sort the demand schedule by using the part name as the major sorting criteria. If part names are equal, then the demand name is used as the minor sorting criteria.

ScheduleSensitivePairCompare

This is used when sorting a schedule, schedule$_a$, based on values found in another schedule, schedule$_b$, which is stored in this class. For example, two itemTimeVecFloatPair objects, $ITV_1$ and $ITV_2$, in schedule$_a$ are compared. The item in $ITV_1$ is item, and the item in $ITV_2$ is item$_2$. If only one of the items is in schedule$_b$, then the ITV associated with the item contained in schedule$_b$ will proceed the one not contained in schedule$_b$. If none of the items is in schedule$_b$, then compare their time vectors in schedule$_a$. If both of the items are in schedule$_b$, use their associated time vectors in schedule$_b$ as the major sorting criteria and their time vectors in schedule, as minor sorting criteria.

TimeVecElementPairCompare

This is used to sort time vectors in a schedule by comparing the value in a single time period.

STEP 6: Use above class structures to develop software

Example of usage of the class structure to populate, filter, and sort a schedule Consider the following pseudo code to extract a schedule of "Demand Volume for Asia" sorted by their gross revenues. This is written in a C++ syntax. The part before ";" shows the actual code and the part after "//" is a comment for that line.

fashion as proposed in this invention. The general purpose Sort subroutine calls a global function SortCompare. SortCompare knows which SortingScheduleFloat object and which PairCompare object to use. Hence, the "correct" pair-compare method defined in the DemandVolumeTimesGrossRevenuePairCompare object will be invoked at runtime. As the main purpose of this invention, all classes mentioned here are tightly related and are worked together in a well-designed sequence to ensure a type-safe data sorting and selection scheme.

SUMMARY

In summary, the generic SortingScheduleFloat class knows how to populate the data automatically based on the knowledge of, Type of data to retrieve (data attribute), Criteria for data selection (filtering), and Data pair-compare strategy for sorting.

Only one generic "sort" method is implemented in the generic SortingScheduleFloat class. It assumes one or more general purpose, non type-safe Sort algorithms are available to use. With properly designed SortingScheduleFloat, ScheduleAttribute, Filter, and PairCompare class structures, as defined above, the Sort subroutines can be invoked in a

```
SortingDemandScheduleFloat dSchedule;              // Create a sorting demand schedule
DemandVolumeScheduleAttribute demandVolume;        // Create a schedule attribute type
                                                   // for this case, demand-volume
DemandNameFilter filter("ASIA");                   // Create a schedule filter
                                                   // and set it to be "ASIA"
                                                   // meaning fetch all "ASIA" demands
DemandVolumeTimesGrossRevenuePairCompare pc;       // Create a pair-compare object
dSchedule.setAttribute(demandVolume);              // Set schedule attribute type
dSchedule.setFilter(filter);                       // Set schedule filter
dSchedule.setPairCompare(pc);                      // Set schedule pair-compare method
dSchedule.populate();                              // Populate data to dSchedule, fetch
                                                   // only "ASIA" demand volumes, and
                                                   // sorted based on demand volume
                                                   // times gross revenue
```

The last step, dSchedule.populate();, will fill "ASIA" demand volumes to dSchedule and sort the data by demand volume times gross revenue.

Implementation of the populate method

Refer to FIGS. 6 (populate method), 7 (kernalOfPopulate method), 15 (sort method), 16 (SortCompare function), 17 (itemTimeVecPairCompareFloat method), and 18 (compareTo method). methods mentioned here. In the last step of the above example, the "populate" method in the general ScheduleAttribute class is invoked. Here is the logic for this method, 1. Clear the demand schedule (a SortingDemandScheduleFloat object).

2. Call the kernalOfPopulate() method in demandVolume object (subclass of ScheduleAttribute class) to populate the data (or a subset of data) since the demandVolume object knows the "correct" type of data to fetch from the database. For this example, demandVolume is an object of class DemandVolumeScheduleAttribute and the filter is an object of class DemandNameFilter with "ASIA" being its filtering criteria. Thus, in this method, only "ASIA" demand volumes are fetched.

3. Call "sort" method in the generic SortingScheduleFloat class by passing in SortingScheduleFloat's PairCompare object and the order sequence (ascending or descending). In this example, the data is to be sorted based on the demand volume times gross revenue. This is done by calling a general purpose, non type-safe Sort subroutine in a type-safe typesafe way. This is because the type associated with the data, the type associated with the Filter object, and the type associated with the PairCompare object, will always be guaranteed to be "correct" by virtue of the polymorphism feature of object-oriented programming.

The main purpose of this invention is to address the type-safe data selecting and sorting problem. General steps to achieve this objective have been described as shown in FIG. 1. An example to illustrate these steps has been implemented using complex and collaborating object-oriented class structures as described in STEP 1 through STEP 6. There are many ways to implement a type-safe sorting. In this example, we chose to use PairCompare class to handle data comparisons for sorting. An alternative implementation is to use Sort class instead of PairCompare class. In the implementation of Sort class, each subclass of Sort class would specify a way to compare two rows of data, or, would specify other sorting algorithms, such as quicksort or heapsort, and other sorting parameters. The main purpose here is not to compare different implementations of sort, but rather to use one particular implementation to illustrate the general method to achieve a type-safe data selecting and sorting as proposed by this invention.

This method (the PairCompare class approach) has been implemented on different types of computer equipment. Here is the description of the computer equipment implementation used for the present invention.

Figure 19:
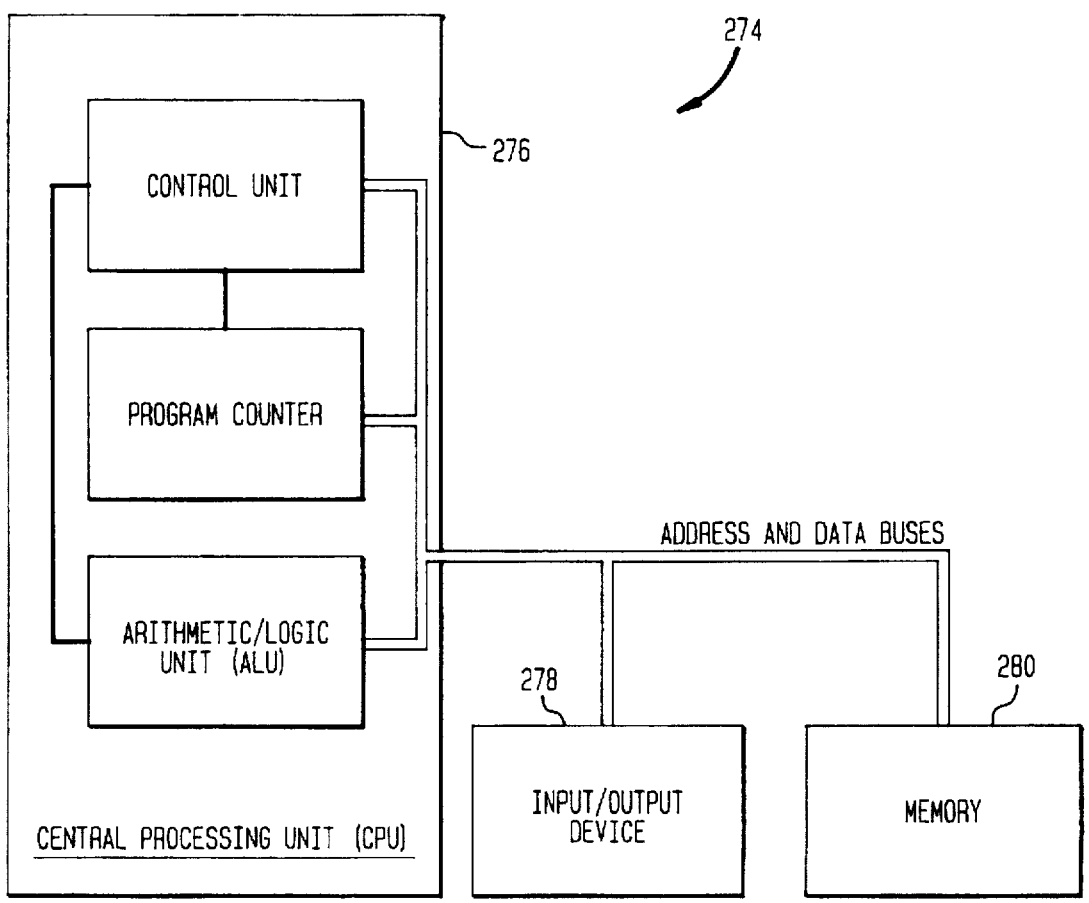
FIG. 19 shows a schematic of a canonical CPU.

The class of computers known as Von Neuman computers contains a memory, a bus, zero or more input/output devices, and a processing unit containing an arithmetic/logic unit, a control unit, and a program counter. The program counter may be considered to be part of the control unit. The bus connects the memory, the input/output (I/O) devices, and the control unit.(See FIG. 19, numerals 274–280.)

The memory 280 contains storage locations that have addresses. The addresses are usually numerical. Data at each storage location can be read and, usually, written. Every Von Neuman machine has some memory that can be written, while some of the memory may be read-only. In particular, memory 280 preferably comprises the information included in FIGS. 1–18.

The bus is able to represent the address of a memory location, the contents of a memory location, and whether the memory location is to be written or read. It may also be able to represent conditions such as changes in the status of I/O devices.

The I/O devices are able to receive instructions via the bus, are able to send status information via the bus, and are able to receive data from the bus and write data on the bus when signalled to do so by the bus. The I/O devices may be able to control the bus, but this is not required. Input devices are able to read data stored in the devices or read from external media and place that data on the bus. Output devices are able to write data from the bus to storage in the device or to external media. Some I/O devices are able to do both.

The processing unit (which may also be referred to as a central processing unit, CPU, or microprocessor), contains an arithmetic/logic unit, a program counter and a control unit (which may also be referred to as an instruction unit). The control unit is what distinguishes Von Neuman computers from calculators.

The processing unit is able to put addresses on the bus, read data from the bus, and write data to the bus. In this way, the processing unit is able to cause data to be read from specified memory locations or I/O devices or write data to specified memory locations or I/O devices.

The processing unit is able to read data from memory locations and treat the data as instructions that control the actions of the control unit and arithmetic/logic unit. At any point in time after the initialization of the computer, the program counter will contain the address of a memory location. In the computer's Instruction Cycle, the processing unit will read the instruction stored at the location specified by the program counter, increment the address in the program counter so that it contains the address of the instruction in memory that follows the instruction just read, and execute the instruction just read.

The processing unit generally has a relatively small amount of storage which can represent the contents of one or more memory locations. This storage is referred to as the register or registers.

The instruction can cause any of the following to happen:
read data from memory or an I/O device into a register
write data from a register to memory or an I/O device
perform an arithmetic or logic calculation using data in one or more registers and/or (optionally) memory locations or I/O devices and writing the result to a register or (optionally) memory location or I/O device
cause the contents of the program counter to be changed, optionally storing the previous value in a register or memory.

Whether the contents of the program counter are changed can be based on the result of an arithmetic or logical calculation or based on a value in a register. This allows different sequences of instructions to be executed.

Figure 20:
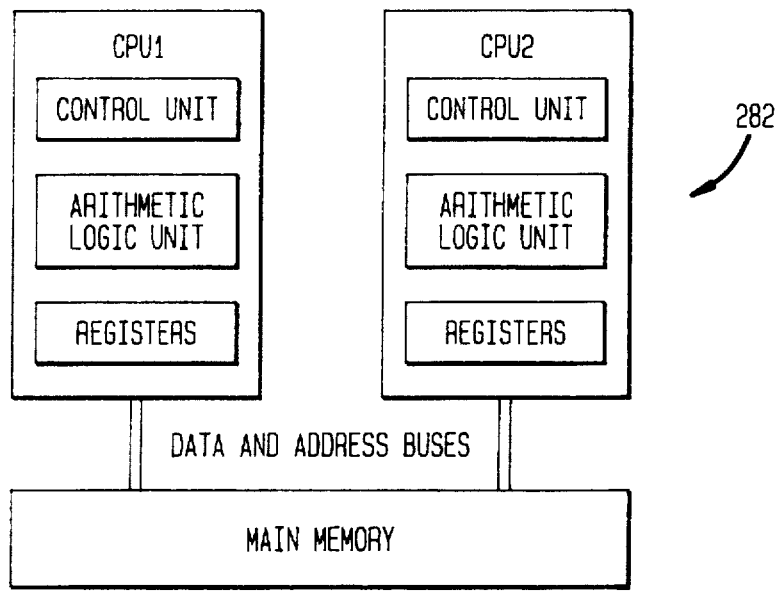
FIG. 20 shows a schematic of multiple independent CPU's.

This describes the fundamental properties of a Von Neuman computer. Many extensions are possible. For example, there may be instructions that read and write memory in one instruction cycle. There may be multiple buses. The I/O devices may be able to take control of the bus (or buses) and read or write data from or to the memory without the processing unit's intervention or assistance. The processing unit may be able to fetch and execute multiple instructions concurrently while providing the abstraction that only one instruction is executed at a time. The computer may provide a virtual memory abstraction, meaning that virtual addresses are mapped to different physical addresses in the memory, allowing programs to use more memory addresses than the computer has in physical memory. (See FIG. 20)

The Von Neuman computer is sometimes referred to as a Single Instruction Single Data computer because, at least in the abstract, it executes one instruction at a time and does zero or one arithmetic/logic calculations at a time.

Figure 21:
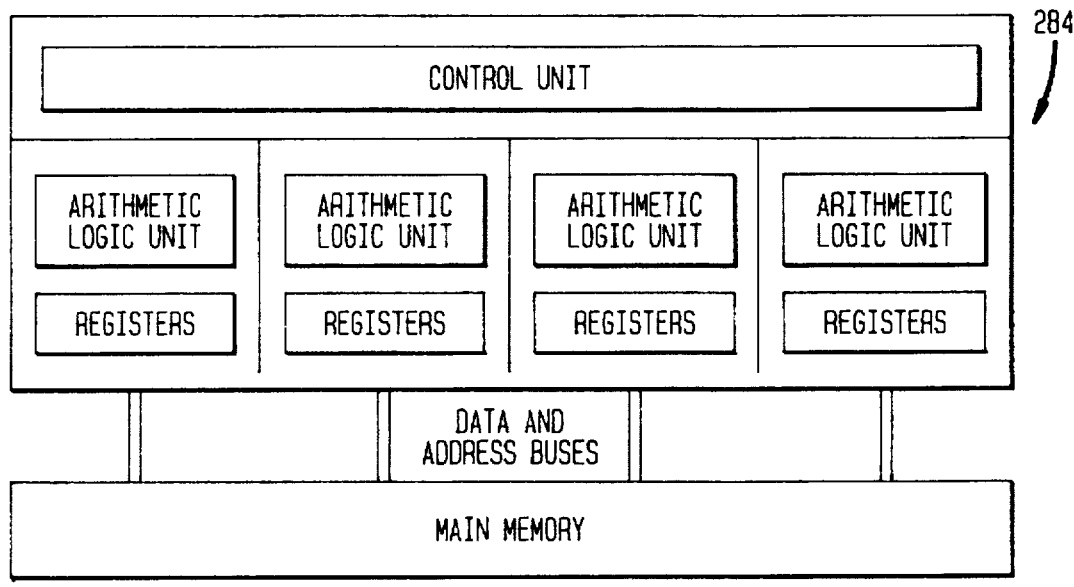
FIG. 21 shows an array processor.

Other computer architectures take the Von Neuman architecture and extend it by adding arithmetic logic units or whole processing units. (See FIG. 20, FIG. 21, numerals 282–284.)

Single Instruction Multiple Data (SIMD) machines execute one instruction at a time (at least in the abstract), but each instruction can cause the same calculation to be done (using data from different registers and/or memory locations) in many different arithmetic/logic units.

Figure 22:
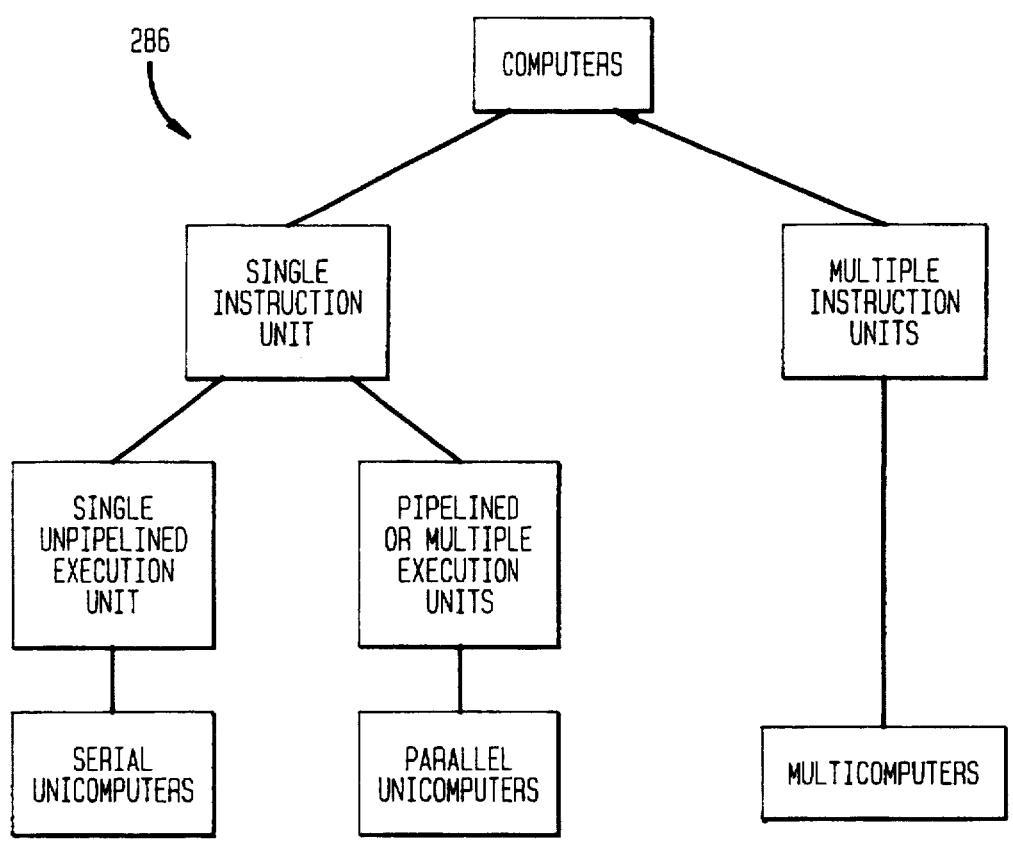
FIG. 22 shows a taxonomy in computer architecture.

If the major sorting criteria does not change the order, then use demand's volume time vector as the minor sorting criteria. Multiple Instruction Multiple Data (MIMD) machines have many processing units and are able to execute many different instructions at the same time. (See FIG. 22, numeral 286.)

What is claimed:
1. A method comprising the steps of:
   a. specifying one or more sets of data of a specified type;
   b. specifying one or more functions associated with the type for selecting subsets of the data;
   c. specifying one or more criteria associated with the type for sorting the subsets;
   d. associating one or more sets with one or more selection functions and one or more sorting criteria;
   e. acquiring data, selecting subsets, and sorting them, always respecting type information.

2. A method according to claim 1, step a, wherein the type of the data is a parameter of the set.

3. A method according to claim 1, explicitly specifying the data type.

4. A method according to claim 1, step a, wherein the type of the data is a class.

5. A method according to claim 1, step a, wherein the type comprises a key (or index element) type and associated data types.

6. A method according to claim 5, wherein the type comprises a class that is used for key/index data and an array type for data related to the key.

7. A method according to claim 1, step a, comprising specifying the data by a function.

8. A method according to claim 1, step a, comprising reading the data from a database.

9. A method according to claim 1, step a, comprising reading the data from a spreadsheet.

10. A method according to claim 1, step b, wherein the function for selecting subsets of the data specifies data to be included.

11. A method according to claim 1, step b, wherein the function for selecting subsets of the data specifies data to be excluded.

12. A method according to claim 1, step b, wherein the function for selecting subsets of the data is a function of one or more other functions for selecting subsets of the data.

13. A method according to claim 1, wherein the function explicitly specifies the data type to be used for selecting subsets of the data.

14. A method according to claim 1, wherein the function for selecting subsets of the data is a function of the key (or index element) of the data.

15. A method according to claim 1, step b, wherein the function for selecting subsets of the data is a function of the data itself.

16. A method according to claim 1, step b, wherein the function for selecting subsets of the data is a function of another set of data which itself is used in claim 1, steps 1a or 1e.

17. A method according to claim 1, step b, wherein the function for selecting subsets of the data is a function of other sets of data.

18. A method according to claim 1, step b, wherein the function for selecting subsets of the data is a function of other sets of data contained in a database.

19. A method according to claim 1, step b, wherein the function for selecting subsets of the data is a function of other sets of data contained in a spreadsheet.

20. A method according to claim 1, step c, wherein the criteria for sorting the data is explicit.

21. A method according to claim 1, step c, wherein the criteria for sorting the data is a function of the key (or index element) of the data.

22. A method according to claim 1, step c, wherein the criteria for sorting the data is a function of other attributes associated with the type.

23. A method according to claim 1, step c, wherein the criteria for sorting the data is a function of the data itself.

24. A method according to claim 1, step c, wherein the criteria for sorting the data is a function of another set of data which itself is used in claim 1, steps 1a or 1e.

25. A method according to claim 1, step c, wherein the criteria for sorting the data is a function of other sets of data.

26. A method according to claim 1, step c, wherein the criteria for sorting the data is a function of other sets of data contained in a database.

27. A method according to claim 1, step c, wherein the criteria for sorting the data is a function of other sets of data contained in a spreadsheet.

28. A method according to claim 1, wherein a model-view controller is used so that:

a. the set can change when the data it is based on changes, b. the subset can change when any of the following change:
1) the set,
2) the selection function, or
3) the data that the selection function uses;

c. the sorted data is changed when any of the following change:
1) the subset,
2) the sort criteria, or
3) the data that the sort criteria uses.

29. A method according to claim 1, comprising implementing steps 1a through 1e on a computer.

30. Computer apparatus comprising:

a. means for specifying one or more sets of data of a specified type;

b. means for specifying one or more functions associated with the type for filtering subsets of the data;

c. means for specifying one or more criteria associated with the type for sorting the subsets;

d. means for associating one or more sets with one or more selection functions and one or more sorting criteria;

e. means for acquiring data, selecting subsets, and sorting said subsets, always respecting type information.

31. A program storage device readable by a machine, tangibly embodying a program of instructions executable by the machine to invoke an arbitrary sorting technique in a type-safe way, said storage device comprising:

a data storage medium; and a program stored on the storage medium for operating the machine to provide an hierarchical schedule class comprising:
a schedule float subclass; and
a sorting schedule float subclass subsumed by the schedule float subclass and comprising:
a schedule attribute class;
a filter class; and
a pair compare class; and using the hierarchical schedule class with each of an independent group consisting of a schedule attribute strategy, a filter strategy and a pair compare class strategy.

* * * * *